(12) United States Patent
Conway

(10) Patent No.: US 7,599,936 B2
(45) Date of Patent: Oct. 6, 2009

(54) PUBLICATION SERVICE USING WEB PAGES AND WEB SEARCH ENGINES

(75) Inventor: Adrian Evans Conway, Weston, MA (US)

(73) Assignee: Verizon Services Organization Inc., Irving, TX (US)

( * ) Notice: Subject to any disclaimer, the term of this patent is extended or adjusted under 35 U.S.C. 154(b) by 253 days.

(21) Appl. No.: 11/615,119

(22) Filed: Dec. 22, 2006

(65) Prior Publication Data

US 2008/0155388 A1    Jun. 26, 2008

(51) Int. Cl.
G06F 17/30 (2006.01)
(52) U.S. Cl. ......................................................... 707/9
(58) Field of Classification Search ........................ None
See application file for complete search history.

(56) References Cited

U.S. PATENT DOCUMENTS

| | | | | |
|---|---|---|---|---|
| 5,802,518 A | * | 9/1998 | Karaev et al. .................. 707/9 |
| 5,819,271 A | * | 10/1998 | Mahoney et al. ............... 707/9 |
| 5,848,426 A | * | 12/1998 | Wang et al. .................. 715/210 |
| 5,872,915 A | * | 2/1999 | Dykes et al. .................... 726/5 |
| 6,122,631 A | * | 9/2000 | Berbec et al. .................. 707/9 |
| 6,282,281 B1 | | 8/2001 | Low |
| 6,532,488 B1 | * | 3/2003 | Ciarlante et al. ............. 709/205 |
| 2002/0069378 A1 | * | 6/2002 | McLellan et al. ............. 714/43 |
| 2004/0123104 A1 | * | 6/2004 | Boyen et al. ................. 713/165 |
| 2004/0133545 A1 | * | 7/2004 | Kiessig et al. ................. 707/1 |
| 2004/0230618 A1 | * | 11/2004 | Wookey ...................... 707/200 |
| 2004/0260676 A1 | * | 12/2004 | Douglis et al. ................. 707/3 |
| 2005/0044366 A1 | * | 2/2005 | Pucheral et al. ............. 713/172 |
| 2007/0208743 A1 | * | 9/2007 | Sainaney ........................ 707/9 |
| 2007/0208755 A1 | * | 9/2007 | Bhatkar et al. ................ 707/10 |

* cited by examiner

*Primary Examiner*—Luke S. Wassum
*Assistant Examiner*—Nirav K Khakhar

(57) ABSTRACT

A server may receive publication information from a client and may create a unique key for the client. The server may generate one or more web pages that include the unique key, the publication information, and instructions for web crawlers not to index or crawl the publication information. In addition, the server may publish the web pages.

18 Claims, 5 Drawing Sheets

PUBLICATION SERVICE USING WEB PAGES AND WEB SEARCH ENGINES

BACKGROUND INFORMATION

A publication service allows a party to publish a particular piece of information that may be conveniently retrieved by another party. However, implementing such a service can be costly in terms of hardware and software. In addition, if proper measures are not taken to safeguard the service, the security of the information may be compromised.

DETAILED DESCRIPTION OF PREFERRED EMBODIMENTS

The following detailed description refers to the accompanying drawings. The same reference numbers in different drawings may identify the same or similar elements.

A publication system allows a client to conveniently share a piece of information with other clients by publishing the information. In the following implementations, the client may publish the information by obtaining and registering a unique key or keys, placing the key and the information on a server, and distributing the key to other clients. At the server, the key and the information may be formatted as web pages, such that a search engine that visits the server may index the web pages based on the key.

After the search engine indexes the web pages, clients that have the key may obtain the published information (1) by using the key in a search query to the search engine to acquire the addresses of the web pages and (2) by visiting, based on the obtained addresses, the web pages. Because the web pages are indexed based on the key, the search engine may not provide, in response to a search query that does not include the key, the addresses of the web pages. Consequently, clients that do not have the key may not directly access the information.

Figure 1:
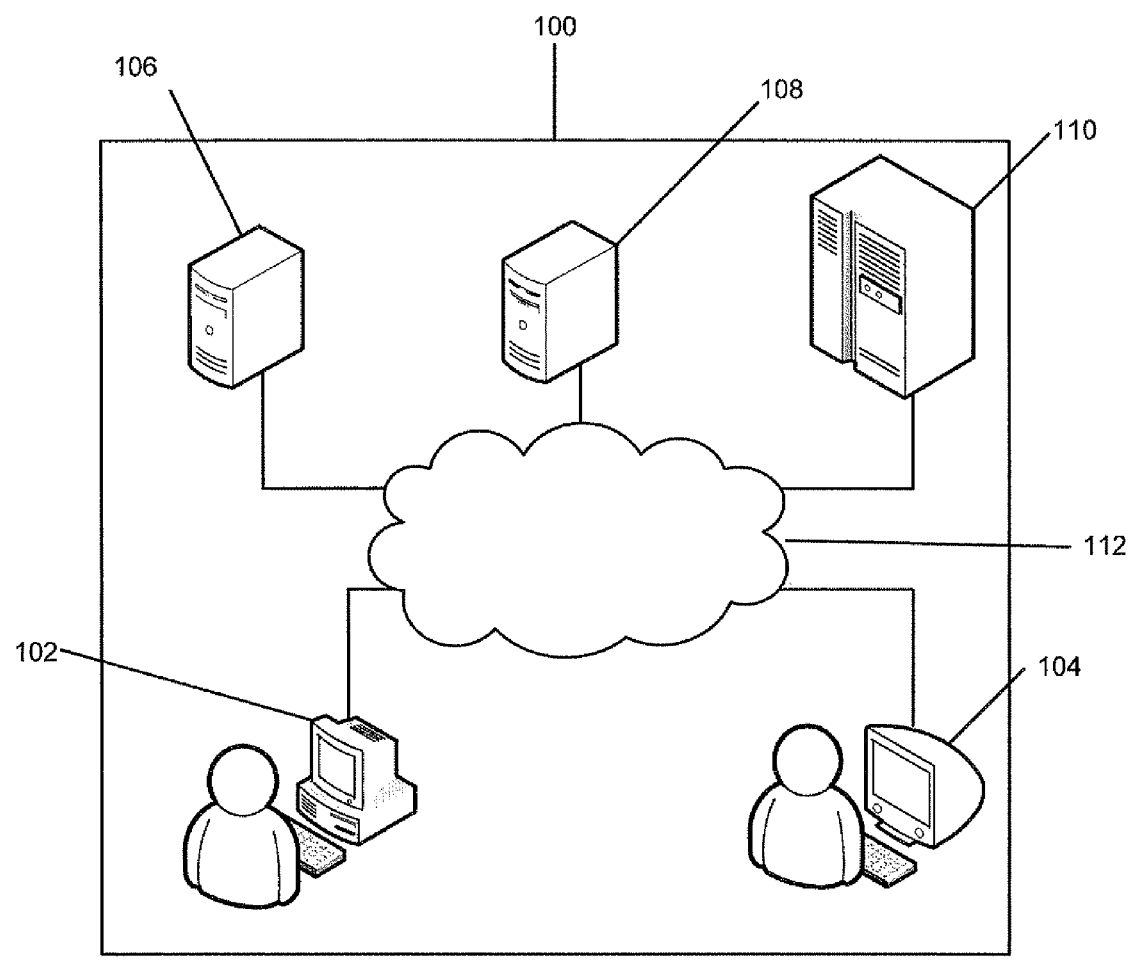
FIG. 1 shows a network in which an exemplary publication system may be implemented.

FIG. 1 shows a network in which an exemplary publication system may be implemented. Network 100 may include client devices 102 and 104, key server device 106, web server device 108, web search engine device 110, and network 112. In practice, network 100 may include more or fewer client devices, key servers, web server devices, web search engine devices and/or networks.

Client device 102 may include a personal computer; a radiotelephone; a personal communications system (PCS) terminal that may combine a cellular radiotelephone with data processing, facsimile, and data communications capabilities; a mobile telephone; an electronic notepad; a laptop; a personal digital assistant (PDA) that can include a radiotelephone, pager, Internet/intranet access, web browser, organizer, calendar; or one or more computer systems with sufficient computing power and memory to support functions described herein. Client device 102 may communicate through network wires, cables, or wireless transceivers with other nodes in network 112. Client device 104 may include similar components as client device 102 and may operate similarly as client device 102.

Key server device 106 may include one or more computer systems for hosting applications for managing keys. The term "key," as used herein, may refer to a piece of information which is used to access or derive other pieces of information. Examples of a key may include a password, an image, an audio signal, a public key of a digital certificate, an encryption key, a decryption key, and/or a sequence of bits. Key server device 106 may receive a request for a unique key from a client device 102/104 and may create, register, and dispense the key to the requesting client device. The key may be unique in the sense that the same key has not been previously issued. Alternatively, or additionally, the key may be unique in the sense that a search performed using the key by a standard search engine would result in no, or very few, search results.

Web server device 108 may include one or more computer systems for hosting a web server application. Web server device 108 may receive a request for uploading or downloading data from client applications that may be hosted by client 102 or 104, process the request, and transmit or receive the data to and from the client applications.

Web search engine device 110 may include one or more computer systems for hosting search engine components. Web search engine device 110 may browse and download information from nodes of network 112, organize and index the downloaded information, and store the organized and indexed information. In addition, web search engine device 110 may accept search requests from client applications on clients 102 and 104 and return to the client applications responses to the search requests.

Network 112 may include the Internet, an ad hoc network, a local area network (LAN), a wide area network (WAN), a metropolitan area network (MAN), a cellular network, a public switched telephone network (PSTN), any other network, or combinations of networks.

Figure 2:
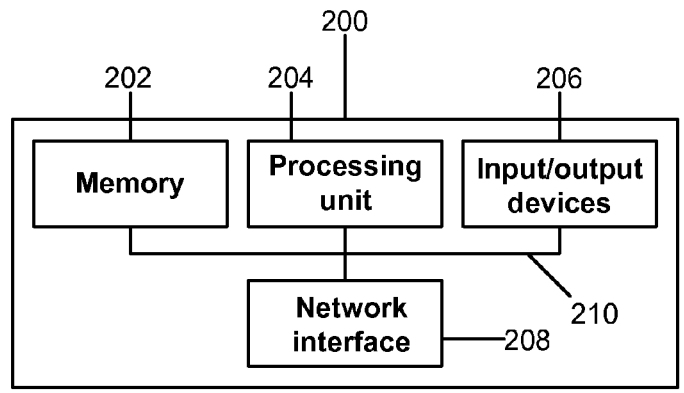
FIG. 2 illustrates an exemplary functional block diagram of a computer system.

FIG. 2 illustrates an exemplary functional block diagram of a computer system 200. Each of client device 102, client device 104, key server device 106, web server device 108, and/or web search engine device 110 may include one or more computer systems 200.

Computer system 200 may include memory 202, processing unit 204, input/output devices 206, network interface 208, and communications interface 210. Memory 202 may include static memory, such as read only memory (ROM), and/or dynamic memory, such as random access memory (RAM), or onboard cache, for storing data and machine-readable instructions. Memory 202 may also include storage devices, such as a floppy disk, CD ROM, CD read/write (R/W) disc, and/or flash memory, as well as other types of storage devices. Processing unit 204 may include one or more processors, microprocessors, and/or processing logic capable of controlling computer system 200. Input/output devices 206 may include a display, printer, keyboard, mouse, speaker, microphone, and/or other types of devices for converting physical events or phenomena to and/or from digital signals that pertain to computer system 200. Network interface 208 interfaces computer system 200 to network 112 and may include a modem, an Ethernet interface or any other types of network interface for communicating with other nodes of network 112. Communications interface 210 may provide an interface through which components of computer system 200 can communicate with one another.

Figures 3A, 3B, 3C:
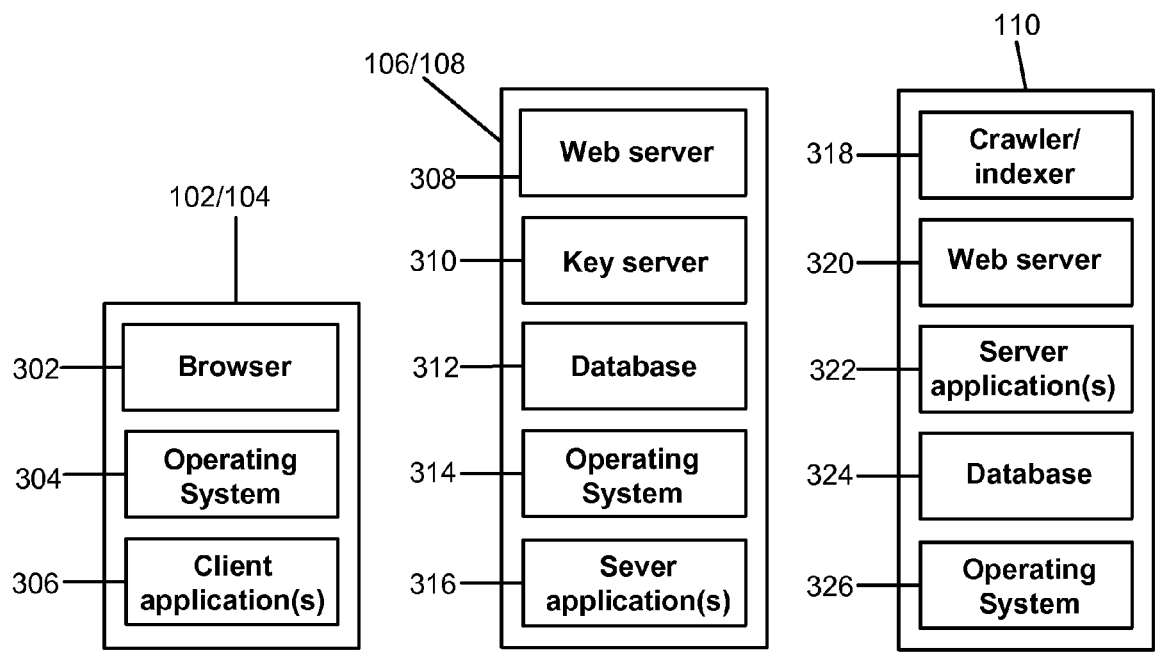
FIG. 3A shows software components that may be present on client devices.
FIG. 3B shows software components that may be present on a key server device and/or a web server device.
FIG. 3C shows software components that may be present on a web search engine device.

FIG. 3A shows software components that may be present on client devices 102 and 104. Client devices 102 and 104 may host browser 302, operating system 304, and client applications 306. Browser 302 may include a software program that enables a user to display and interact with text, images, and other types of information placed on web pages. Operating system 304 may include a computer program for managing hardware and software resources of client device 102 and 104. Client applications 306 may include software programs that provide services to individual users either in stand-alone mode or in conjunction with server applications. Examples of client applications 306 include a file-transfer-protocol (FTP) client and an email client.

FIG. 3B shows software components that may be present on key server device 106 and/or web server device 108. Key server device 106 and/or web server device 108 may host a web server 308, key server 310, database 312, operating system 314, and server applications 316. Web server 308 may include a software application for exchanging web page related information with one or more browsers 302 and/or client applications 306. Key server 310 may include a software application for receiving requests for unique keys, creating, registering, and dispensing the keys to the requesting client applications 306. In an alternative implementation, key server 310 may interact with one or more browsers 302 and/or client applications 306 through web server 308, which may relay information between key server 310 and browser 302.

Database 312 may include records and files and may act as an information repository for web server 308, key server 310, and/or server applications 316. For example, web server 308 may obtain information from database 312 for preparing responses to browser 302 and/or client applications 306 and may place information received from browser 302 and/or client applications 306 in database 312. Key server 310 may use database 312 to record unique keys and/or to perform lookups of the keys. Operating system 314 may include a computer program for managing hardware and software resources of key server device 106 and/or web server device 108.

Server applications 316 may include a browser and software programs for rendering services. Examples of server applications 316 include an FTP server, an email server, a telnet server, servlets, Java™ virtual machine (JVM), web containers, fire wall, components to support Authorization, Authentication and Accounting (AAA), and other applications that either interact with client applications or operate in stand-alone mode. In addition, server applications 316 may include a specialized server program, application servers, web pages, or web forms to help clients with publishing information.

Because key server device 106 and/or web server device 108 may include one or more computer systems 200, the software components (i.e., web server 308, key server 310, database 312, operating system 314, and server applications 316) may be distributed over many nodes in a local or distributed network. In addition, there may be more than one copy of any of the software components.

FIG. 3C shows software components that may be present on web search engine device 110. Web search engine device 110 may host crawler/indexer 318, web server 320, server applications 322, database 324, and operating system 326. Crawler/indexer 318 may include scripts and/or programs for browsing and downloading information from nodes of network 112, for organizing and indexing the downloaded information, and for storing the organized and indexed information into database 324. Web server 320 may include a software application for exchanging web page related information with one or more browsers 302 and/or client applications 306. Server applications 322 may include a browser and software programs for rendering services.

Database 324 may include records and files and may act as an information repository for crawler/indexer 318, web server 320, and/or server applications 322. For example, web crawler 318 may store organized and indexed information in database 324. Web server 320 may obtain information from database 324 for preparing responses to browser 302 and/or client applications 306 and may place information received from browser 302 and/or client applications 306 in database 324. Operating system 326 may include a computer program for managing hardware and software resources of web search engine device 110.

Because web search engine device 110 may include one or more computer devices 200, the software components (i.e., crawler/indexer 318, web server 320, server applications 322, database 324, and operating system 326) may be distributed over many nodes in a local or distributed network. In addition, there may be more than one copy of any of the software components.

The preceding paragraphs describe an exemplary publication system and its elements, such as client devices 102 and 104, key server device 106, web server device 108, web search engine device 110, network 112, and software applications and components that may be hosted on the elements. The following describes processes performed by the elements for publishing and sharing information.

Figure 4:
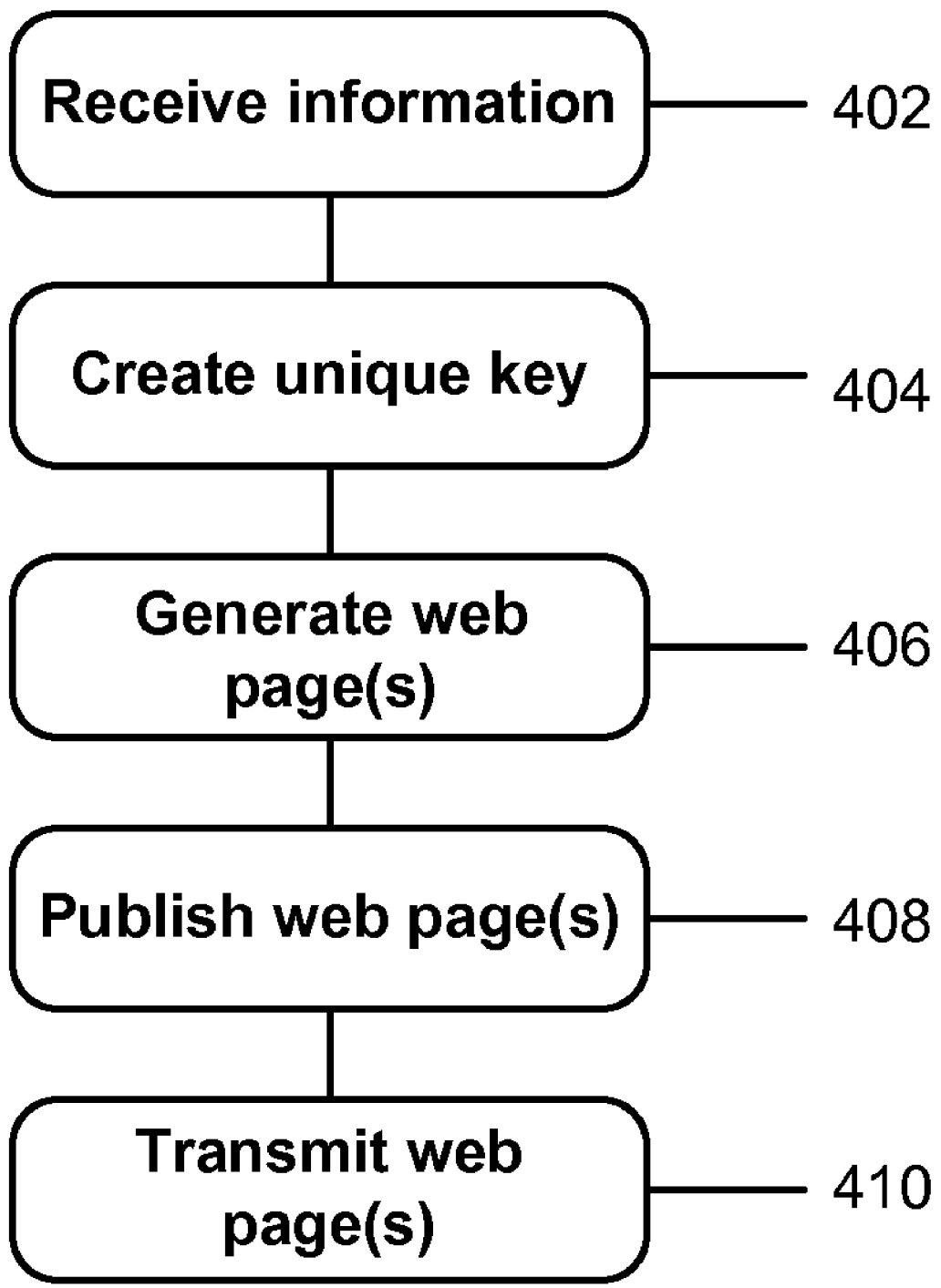
FIG. 4 illustrates a flowchart of an exemplary process for publishing information.

FIG. 4 illustrates a flowchart of an exemplary process for publishing information. At block 402, information that is to be published is received from client application 306 that uploads the information. The uploading may be performed by any suitable client application 306, such as an FTP client or an email client, depending on specific key server device 106 and/or web server device 108 configurations and available server applications 316. For example, if server applications 316 include an FTP server that services an FTP client on client device 102, client device 102 may upload the information using the FTP client. In another example, server applications 316 may provide a set of programs or web interfaces that interact with client application 306 to facilitate uploading the information.

At block 404, a unique key (or keys) may be created and registered, and a copy of the key may be provided to the user. The key may be created at client application 306, key server 310, or server application 316, either automatically or based on user inputs, depending on implementation.

In one implementation, there may be a central database of existing keys that may be used by one or more key servers and/or web servers. In such an implementation, the servers can guarantee the uniqueness of the key in network 112, by generating a piece of information as the key that is not already in the database. The newly created key is inserted, or "registered," at the database.

In another implementation, it is possible to create the key without a central database of keys. In such an implementation, the key may be created by first generating the piece of information, either automatically or based on user inputs, and then verifying whether the string is unique by performing search queries using the piece of information at one or more web search engines in network 112. If the queries do not return any, or just a few, search results, the piece of information may be returned as a unique key. If the queries return many search results, the process for creating the key may be restarted and repeated.

At block 406, one or more web pages that include the received information and the key at web server device 108 may be generated. The term "web page," as used herein, may include a document, image, picture, sound or text file, post script file, email, or any piece of information that may be linked or embedded in another document. If the web page is created at web server device 108 that is different than one that is to host the web page, however, the web page may be transported to the host computer system, either automatically or through user intervention.

Figure 5A:
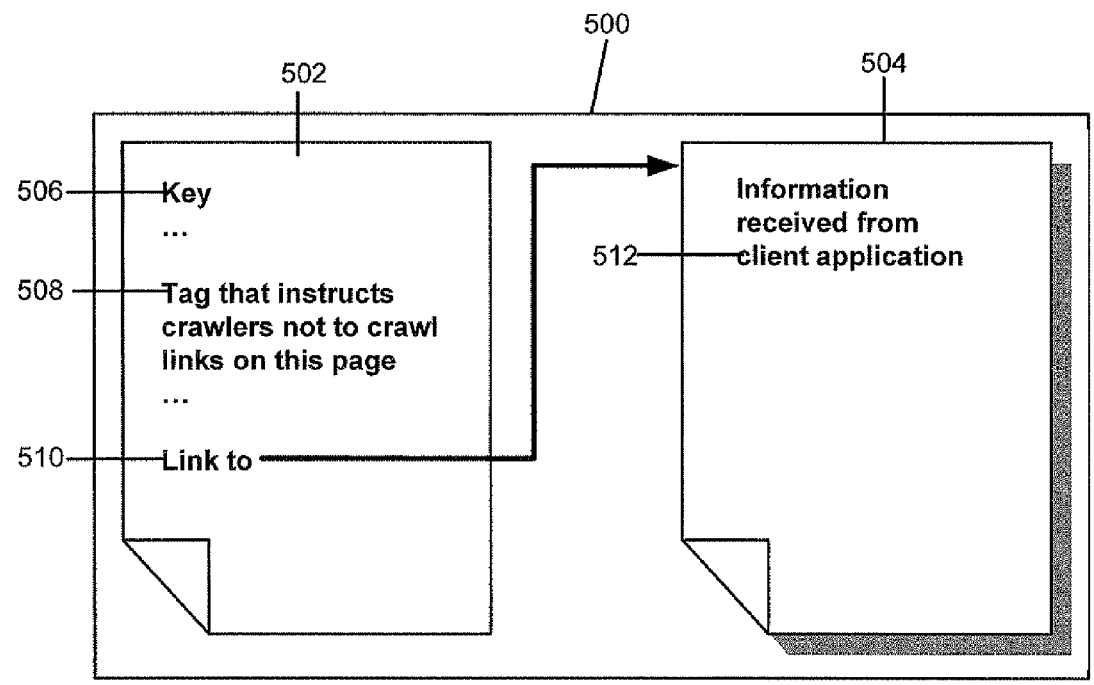
FIG. 5 shows an exemplary layout of web pages.

FIG. 5A shows an exemplary layout of a web page 500. Web page 500 may include key page 502 and content page 504. Key page 502 may include key 506 and meta tag 508, which instructs web crawlers to not crawl or follow any links in key page 502. In addition, key page 502 may include link 510 to content page 504. A key page may include one or many keys and/or links, even though key page 502 is illustrated as having one key and one link. Content page 510 contains received information 512 that is uploaded by the client application.

Assuming that web page 500 is at web server device 108 and that the only links to content page 504 are in key page 502, web crawlers that visit web server device 108 may download key page 502, but not content page 504. The web crawlers may not follow link 510 in key page 502, provided that the web crawlers adhere to meta tag 508. Consequently, content page 504 and information 512 may not be downloaded or indexed by search engines.

Figure 5B:
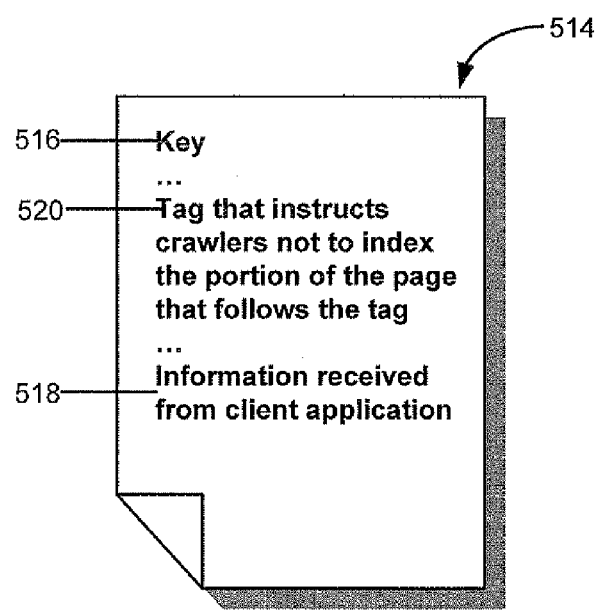

FIG. 5B shows another exemplary layout of a web page 514. Web page 514 may include key 516, received information 518, and tag 520 that may instruct web crawlers not to index received information 520 on web page 514. Assuming that web page 514 is at web server device 108, web crawlers that visit web server device 108 may index the portion of web page 514 that contains key 516, but not the portion of web page 514 that contains received information 518, provided that the web crawlers adhere to tag 520.

While FIGS. 5A and 5B show two possible layouts for a web page, other layouts are possible. Web page layouts may depend on what web page tags (e.g., html tags) are recognized and used by web crawlers.

Referring back to FIG. 4, at block 408, the web page that has been generated may be published. The term "publishing" or "publication," as used herein, may refer to making the web page accessible to other client applications, browsers, and/or search engines in network 112. For example, a publication of key page 502 and/or web page 514 at a web site may involve editing or inserting links to key page 502 and/or web page 514 in other web pages at the web site, such that web crawlers that traverse the web site may be able to reach, download, and/or index key page 502 and/or web page 514. Publication of web pages may be performed automatically by server applications and/or client applications.

Referring back to FIG. 5A, once key page 502 is published, web crawlers/indexers of web search engine device 110 may download, organize, and index key page 502. As already explained with reference to FIG. 5A, web crawler/indexer that obeys meta-tag directives may not download and index content page 504. However, because key page 502 may be downloaded and indexed, any user that queries web search engine device 110 using the key as one of the search criteria may obtain from web search engine device 110 the address of key page 502. Furthermore, because content page 504 is not downloaded and indexed, web search engine device 110 may not return the address of content page 504 in response to queries that include any pieces of information in content page 504.

Referring back to FIG. 5B, once web page 514 is published, web crawlers/indexers of web search engine device 110 may download, organize, and index web page 514. As already explained with reference to FIG. 5B, web crawler/indexer that obeys tag 520 may not index web page 514 based on received information 518. However, because web page 514 may be downloaded and indexed based on key 516, any user that queries web search engine device 110 using the key as one of the search criteria may obtain from web search engine device 110 the address of web page 514. Furthermore, because web page 514 is not indexed based on received information 520, web search engine device 110 may not return the address of web page 514 in response to queries that include any of pieces of received information 520.

When a user obtains a copy of the key that has been created, the user may distribute the key to others that the user wants to have access to the information. The key may be distributed by using an email client, FTP client, and/or browser, by posting the key at a well-known web site, newsgroup, and/or blog site, and/or by using any well known and secure communication method.

Referring back to FIG. 4, at block 410, the published information may be transmitted to any user that is in possession of the key. The user may access the published information by using web search engine device 110 that has indexed key page 502 and/or web page 514. To access the published information, the user may present web search engine device 110 with a search request that includes the key as one of its search criteria. In response, web search engine device 110 processes the search request and returns the address of key page 502 and/or web page 514 that contain the key as a search result. By accessing key page 502 and/or web page 514 based on the returned address, the user may access the published information.

Many changes to the publication process and to the retrieval process associated with the published information described above may be implemented. In an alternative implementation, client device 102 may upload the information and the key to more than one web server device 108 and, therefore, post the information and the key at more than one web site. Multiple web sites provide redundancy protection against failure of one web site, as well as increased security measure against attacks, such as denial-of-service attacks.

In another implementation, client device 102 may divide the information into portions and distribute them, along with a key, to a set of web server devices, using an encoding scheme. The portions of the information and the key that have been uploaded to the set of web server devices may be collected and decoded to retrieve the original information by a party with proper authorization. The encoding and decoding schemes may provide a redundancy safeguard against the loss of information due to a failure of a web server device, as well as error-detection and correction.

Figure 6:
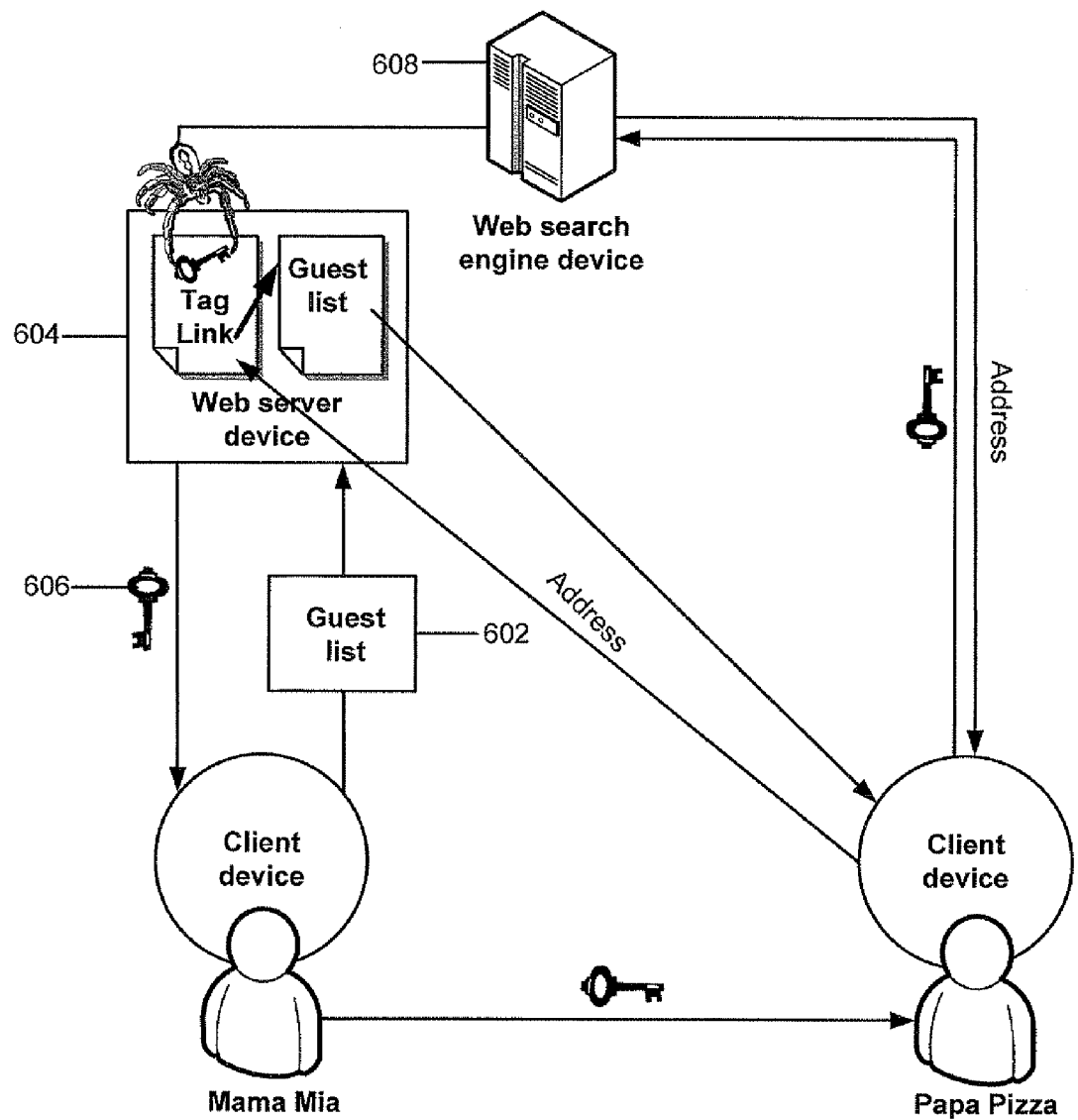
FIG. 6 illustrates processes involved in a publication and a retrieval of published information.

The following example, in conjunction with FIG. 6, illustrates processes involved in a publication and a retrieval of published information in accordance with implementations described with respect to FIG. 4.

Assume that Mama Mia decides to publish a list of guests for an upcoming event and to allow her friend Papa Pizza to access this list. Mama Mia uploads her guest list 602. Upon receiving guest list 602, web server device 604 creates unique key 606 based on its database of keys (not shown) that already have been issued. Web server device 604 sends key 606 to Mama Mia, who forwards key 606 to Papa Pizza.

Using key 606 and guest list 602, web server device 604 creates a web page in accordance with the layout illustrated in FIG. 5A. The created web page includes a key page and a content page. The key page includes key 606, a link to the content page, and a tag that instructs web crawlers not to follow the link to the content page. The content page includes guest list 602.

Once generated, the key page and the content page are linked into a web site at web server device 604. Furthermore, a web crawler dispatched by Internet web search engine device 608 downloads and indexes the key page.

To obtain guest list 602, Papa Pizza submits a search query to web search engine device 608, which has indexed the key page, and obtains the address to the key page from web search engine device 608. By using the address, Papa Pizza accesses the key page and follows the link within the key page to the content page. The content page, which contains the guest list, is transmitted to Papa Pizza.

The foregoing description of embodiments provides illustration, but is not intended to be exhaustive or to limit the embodiments to the precise form disclosed. Modifications and variations are possible in light of the above teachings or may be acquired from practice of the teachings.

For example, while series of blocks have been described with regard to processes illustrated in FIG. 4, the order of the blocks may be modified in other implementations. Further, non-dependent blocks may represent acts that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method performed by a device, the method comprising:
   receiving, by the device, publication information from a first client;
   creating, by one or more processors of the device, a unique key;
   generating, by the one or more processors, one or more web pages, where content of the one or more web pages includes the unique key, the publication information, and instructions not to crawl or index the publication information;
   publishing, by the one or more processors, the one or more web pages;
   indexing, by the one or more processors and for searching purposes, the unique key from the one or more web pages; and
   transmitting one or more web pages, which include the publication information, to a second client that has the unique key, the first client distributes the unique key to the second client to allow the second client to access the publication information included in the one or more web pages, the second client obtains one or more addresses of the one or more web pages, which contain the unique key, by sending a search query that includes the unique key to a search engine that has indexed the one or more web pages that contain the unique key.

2. The method as in claim 1, where generating the one or more web pages includes:
   partitioning the publication information into portions;
   encoding each portion of the publication information to enable error correction and error detection; and
   writing each portion to a group of one or more web pages.

3. The method as in claim 1, where publishing the one or more web pages includes linking the one or more web pages to enable a crawler to visit each web page that contains the unique key.

4. The method as in claim 1, where publishing the one or more web pages further includes hosting the one or more web pages on more than one web server.

5. The method as in claim 1, where publishing the one or more web pages includes posting the one or more web pages at one or more different web sites.

6. The method as in claim 1, where creating a unique key includes:
   creating a piece of information as a candidate key; and
   testing if the piece of information exists within a database of keys.

7. The method as in claim 1, further comprising:
   making the one or more web pages available for crawling or indexing by one or more search engines.

8. A device comprising:
   one or more processors to:
      accept private information from a client;
      produce a unique key;
      format one or more web pages that include the unique key, the private information, and instructions for search engines not to index the private information;
      permit each web page that contains the unique key to be indexed by the search engines; and
      transmit one or more web pages, which include the private information, to a second client that has the unique key, the client distributes the unique key to the second client to allow the second client to access the private information included in the one or more web pages, the second client obtains one or more addresses of the one or more web pages, which contain the unique key, by sending a search query that includes the unique key to a search engine, of the search engines that have indexed the one or more web pages that contain the unique key.

9. The device as in claim 8, where the formatted one or more web pages include at least one web page that contains at least a portion of the private information.

10. The device as in claim 9, where the at least one web page that contains at least a portion of the private information also contains the unique key.

11. The device as in claim 8, where the formatted one or more web pages include a web page that contains the unique key and one or more web pages that include at least a portion of the private information.

12. The device as in claim 8, where the web page that contains the key includes:
one or more links to one or more web pages that include at least a portion of the private information; and
the instructions for the search engines not to index the private information.

13. The device as in claim 8, further comprising a database for registering the unique key.

14. The device as in claim 8, where the instructions comprise meta tags.

15. The device as in claim 8, where a link to a web page that contains the unique key is embedded in a web page that the search engines index.

16. A device comprising:
means for accepting information from a client;
means for creating a unique key;
means for generating one or more web pages, content of the one or more web pages including the unique key, the information, and an instruction for search engines not to download the information;
means for publishing the one or more web pages;
means for transmitting the one or more web pages, which include the information, to a second client that has the unique key, the client distributes the unique key to the second client to allow the second client to access the information included in the one or more web pages, the second client obtains one or more addresses of the one or more web pages, which contain the unique key, by sending a search query that includes the unique key to a search engine that has indexed the one or more web pages that contain the unique key.

17. The device as in claim 16, where the means for creating the unique key comprises:
means for creating a sequence of bits as a candidate key, and
means for testing if the candidate key is unique.

18. The device as in claim 16, where the unique key includes:
an image.

* * * * *